(12) United States Patent
Appleton et al.

(10) Patent No.: US 9,286,021 B2
(45) Date of Patent: Mar. 15, 2016

(54) DISPLAYING MAP LAYERS IN ORDER

(75) Inventors: Benjamin Charles Appleton, Summer Hill (AU); James Brian McGill, Forest Lodge (AU)

(73) Assignee: Google Inc., Mountain View, CA (US)

(*) Notice: Subject to any disclaimer, the term of this patent is extended or adjusted under 35 U.S.C. 154(b) by 113 days.

(21) Appl. No.: 13/531,469

(22) Filed: Jun. 22, 2012

(65) Prior Publication Data

US 2013/0342545 A1 Dec. 26, 2013

(51) Int. Cl.
*G06T 11/60* (2006.01)
*G06T 3/40* (2006.01)
*G06F 3/14* (2006.01)
*G01C 21/36* (2006.01)
*G09B 29/00* (2006.01)

(52) U.S. Cl.
CPC .............. *G06F 3/14* (2013.01); *G01C 21/367* (2013.01); *G01C 21/3667* (2013.01); *G06T 3/40* (2013.01); *G06T 3/4038* (2013.01); *G06T 11/60* (2013.01); *G09B 29/007* (2013.01); *G09G 2360/122* (2013.01); *G09G 2370/022* (2013.01)

(58) Field of Classification Search
CPC ..................... G05B 2219/23258; G06F 17/24; G06F 3/013; A63F 2300/203; G01C 21/3667; G01C 21/367; G06T 3/4038; G06T 3/40
See application file for complete search history.

(56) References Cited

U.S. PATENT DOCUMENTS

| | | | |
|---|---|---|---|
| 6,714,690 B1* | 3/2004 | Shimizu | 382/293 |
| 7,158,878 B2* | 1/2007 | Rasmussen et al. | 701/431 |
| 7,439,969 B2* | 10/2008 | Chithambaram et al. | 345/418 |
| 7,639,162 B2* | 12/2009 | Reed et al. | 340/995.19 |
| 7,657,504 B2* | 2/2010 | Jing et al. | 715/855 |
| 7,925,100 B2* | 4/2011 | Howell et al. | 382/232 |
| 8,510,043 B1* | 8/2013 | Whiton et al. | 701/454 |
| 2002/0039108 A1* | 4/2002 | Roy et al. | 345/619 |
| 2004/0066316 A1* | 4/2004 | Ogawa | 340/995.1 |
| 2004/0117358 A1* | 6/2004 | von Kaenel et al. | 707/3 |
| 2004/0230371 A1* | 11/2004 | Vincent et al. | 701/200 |
| 2005/0033511 A1* | 2/2005 | Pechatnikov et al. | 701/210 |
| 2006/0241860 A1* | 10/2006 | Kimchi et al. | 701/208 |
| 2008/0040678 A1* | 2/2008 | Crump | 715/763 |
| 2008/0059889 A1* | 3/2008 | Parker et al. | 715/748 |
| 2009/0052806 A1* | 2/2009 | Morbey et al. | 382/302 |
| 2009/0262121 A1* | 10/2009 | Opala et al. | 345/537 |

(Continued)

FOREIGN PATENT DOCUMENTS

| | | |
|---|---|---|
| EP | 1986176 A1 | 10/2008 |
| KR | 10-0841907 B1 | 6/2008 |

OTHER PUBLICATIONS

Vyron Antoniou, Jeremy Morley, and Mordechai (Muki) Haklay, Tiled Vectors: A Method for Vector Transmission over the Web, 2009, Springer Berlin Heidelberg, In Web and Wireless Geographical Information Systems, W2GIS, vol. 5886, pp. 56-71.*

(Continued)

*Primary Examiner* — Jeffery A Brier
(74) *Attorney, Agent, or Firm* — Dority & Manning, P.A.

(57) ABSTRACT

A system and method for displaying map layers in order. First vector data which defines one or more features of a first layer of a map is received from a server. Second vector data which defines one or more features of a second layer of the map is received from the server. A first order for displaying the one or more features of the first layer relative to the one more features of the second layer is received. The first vector data and the second vector data are rendered for display based on the received first order, to display the one or more features defined by the first layer relative to the one or more features defined by the second layer based on the received first order.

15 Claims, 5 Drawing Sheets

(56) References Cited

U.S. PATENT DOCUMENTS

| | | | |
|---|---|---|---|
| 2010/0002012 A1* | 1/2010 | Andreasson | 701/208 |
| 2010/0082240 A1* | 4/2010 | Short | 701/208 |
| 2011/0196610 A1* | 8/2011 | Waldman et al. | 701/209 |
| 2012/0029817 A1* | 2/2012 | Khorashadi et al. | 701/451 |
| 2012/0215817 A1* | 8/2012 | Wheeler et al. | 707/803 |

OTHER PUBLICATIONS

Dong Nguyen, Tuan Tran, Thinh Nguyen, and Bella Bose, Wireless Broadcast Using Network Coding, Feb. 2009, IEEE Transactions on Vehicular Technology, vol. 58 No. 2, pp. 914-925.*

George, "Chapter 20: Scalable Vector Graphics Interfaces for Geographic Applications", in Geographic Hypermedia: Lecture Notes in Geoinformation and Cartography, © Springer-Verlag Berlin Heidelberg 2006, pp. 369-380.

Kishore, "How to Permanently Stop Dock Icons from Bouncing", posted to SWITCHTOMAC blog on Jun. 10, 2009, 2 screen captured web pages.

Kothuri et al., "Pro Oracle Spatial for Oracle Database 11g." Copyright © 2007, 787 pages.

* cited by examiner

DISPLAYING MAP LAYERS IN ORDER

BACKGROUND

The present disclosure generally relates to digital maps, and, in particular, to displaying map layers in order.

Conventional systems render complex map layers as image tiles. Some web browsers impose restrictive limitations on the number of concurrent HTTP requests. As a result, rendering a map containing multiple layers, each consisting of many tiles, can be prohibitively slow. Such systems typically mitigate this by compositing layers in the image tile server to form a single image tile set.

SUMMARY

The disclosed subject matter relates to machine-implemented method of displaying map layers in order. The method includes receiving, from a server, first vector data which defines one or more features of a first layer of a map, and receiving, from the server, second vector data which defines one or more features of a second layer of the map. The method further includes receiving a first order for displaying the one or more features of the first layer relative to the one more features of the second layer, and rendering the first vector data and the second vector data for display based on the received first order, to display the one or more features defined by the first layer relative to the one or more features defined by the second layer based on the received first order.

The disclosed subject matter further relates to a system for displaying map layers in order. The system includes one or more processors, and a machine-readable medium comprising instructions stored therein, which when executed by the processors, cause the processors to perform operations including receiving, from a server, first vector data which defines one or more features of a first layer of a map, and receiving, from the server, second vector data which defines one or more features of a second layer of the map. The operations further include receiving a first order, corresponding to a user-specified value, for displaying the one or more features of the first layer relative to the one more features of the second layer, and rendering the first vector data and the second vector data for display based on the received first order, to display the one or more features defined by the first layer relative to the one or more features defined by the second layer based on the received first order.

The disclosed subject matter also relates to a machine-readable medium comprising instructions stored therein, which when executed by a system, cause the system to perform operations including receiving, from a server, first vector data which defines one or more features of a first layer of a map, wherein the first layer of the map corresponds to at least one point of interest specified by a user. The operations further include receiving, from the server, second vector data which defines one or more features of a second layer of the map, wherein the second layer of the map corresponds to at least one other point of interest specified by the user, receiving a first order for displaying the one or more features of the first layer relative to the one more features of the second layer, and rendering the first vector data and the second vector data for display based on the received first order, to display the one or more features defined by the first layer relative to the one or more features defined by the second layer based on the received first order.

It is understood that other configurations of the subject technology will become apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
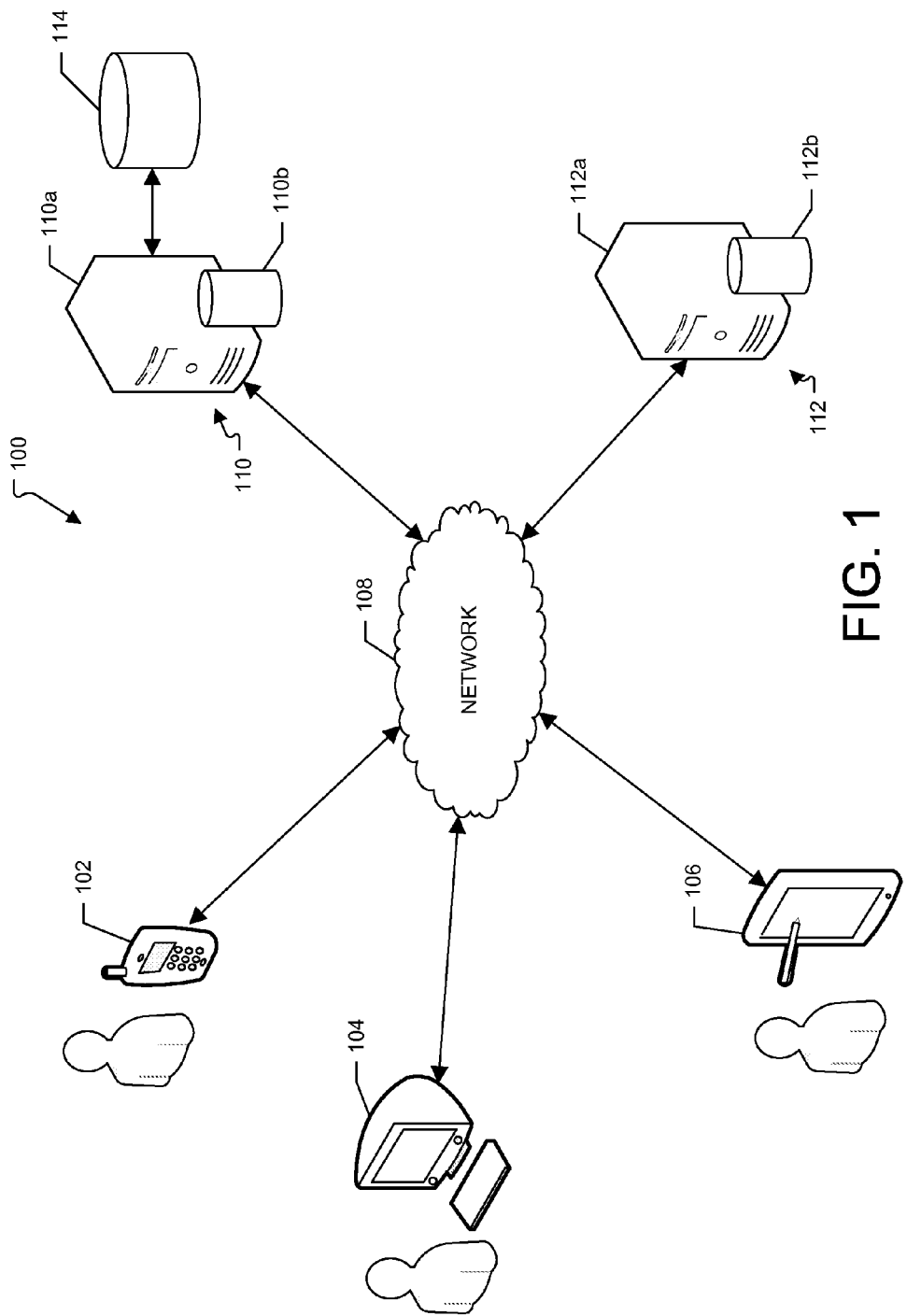
FIG. 1 illustrates an example distributed network environment which can provide displaying map layers in order.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, conventional systems render complex map layers as image tiles. Some web browsers impose restrictive limitations on the number of concurrent HTTP requests. As a result, rendering a map containing multiple layers, each consisting of many tiles, can be prohibitively slow. Such systems typically mitigate this by compositing layers in the image tile server to form a single image tile set.

However, compositing multiple layers into a single image can prevent a user from reordering those layers in an application (e.g., a web browser). For example, a user may request to display two layers: a layer containing the positions of all power poles that they maintain, and a layer containing the positions of all workers. In some regions, the power pole layer may occlude the view of all workers, whereas in other regions, the worker layer may occlude the view of all power poles. Thus, it may be desirable to reorder the display of map layers relative to one another, without having to refetch data from the HTTP server.

The disclosed subject matter relates to a system for downloading complex map layers as vector tiles and rendering the vector tiles in a client a browser, phone or tablet). Vector tiles can be reordered by repainting the layers in a desired order, without having to refetch any data from the server. This enables a responsive user interface to quickly toggle the layer order.

More particularly, the disclosed subject matter provides for displaying map layers in order. First vector data which defines one or more features for a first layer of a map is received from a server. Second vector data which defines one or more features for a second layer of the map is received from the server. An order for displaying the one or more features of the first layer relative to the one more features of the second layer is received. The first vector data and the second vector data are rendered for display based on the received order, to display the one or more features defined by the first layer relative to the one or more features defined by the second layer based on the received order.

The receiving of the first vector data, the receiving of the second vector data and the rendering can be performed by a web browser. The first layer of the map can correspond to at least one point of interest specified by a user, and the second layer of the map corresponds to at least one other point of interest specified by the user. In addition, the order can be a user-specified value.

FIG. 1 illustrates an example distributed network environment which can provide displaying map layers in order. A network environment 100 includes computing devices 102, 104 and 106, and computing systems 110 and 112. Computing system 112 can access storage device 114, which corresponds to one or more databases. Computing devices 102-106, and computing systems 110-112 can communicate with each other through a network 108. Each of computing systems 110-112 can include one or more computing devices 110a-112a (e.g., one or more servers), respectively, and one or more computer-readable storage devices 110b-112b (e.g., one or more databases), respectively.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 110a-112a may be provided access to or receive application software executed or stored on any of the other computing systems 102-106 and 110a-112a.

Each of computing devices 110a-112a may be any system or device having a processor, a memory, and communications capability for providing content to the electronic devices. In some example aspects, each of servers 110-112 can be a single computing device, for example, a computer server. In other embodiments, each of servers 110-112 can represent more than one computing device working together to perform the actions of a server computer (e.g., cloud computing). Further, each of computing devices 110a-112a can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes Or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102, 106) and server (e.g., servers 110-112) can occur via a virtual private network (VPN), Secure Shell (SSH) tunnel, or other secure network connection. In some aspects, network 108 may further include a corporate network (e.g., intranet) and one or more wireless access points.

In example aspects, processing device 110a executes computer instructions stored in data store 110b, for example, to host a mapping service. The mapping service may be implemented using any combination of markup language and scripting elements, e.g., using HTML and Javascript. The mapping service may be accessible via a graphical user interface (GUI) provided display for any of electronic devices 102-106. Such a GUI may include functions enabling the user of electronic device 102-106 to manipulate a position and orientation of a virtual camera in order to view portions of a geographic area corresponding to a digital map from different perspectives. The GUI may be presented as a map viewer (e.g., within a browser or other application on electronic device 102-106). In example aspects, such a mapping service displays a visual representation of a map, e.g., as a viewport for displaying a grid of rendered tiles.

In this regard, the mapping service hosted on server 110 accesses vector tiles (e.g., from storage device 114). In example aspects, the mapping service may retrieve bulk and/or individual vector tiles (e.g., from storage device 114). As used herein, a "vector tile" refers to vector data from which an image corresponding to a mapping tile can be rendered. Vector tiles describe geographic features (e.g., bodies of water, mountains, landmarks, buildings or other structures, etc.), such as data from a geographic information system (GIS). A vector tile includes vector data for points, lines or polygons (e.g., rectangles, circles, other geometric features, or rasters such as overlaid images), where the points, lines and polygons represent features of a map. In example aspects, a vector tile includes attributes for the features represented by the vector data. These attributes include, but are not limited to, color, size, style, associated text, highlighting and animation for the points, lines and polygons. In other example aspects, the attribute data is provided separate from the vector tiles themselves.

As the viewport within the GUI is moved (e.g., based on user input at electronic device 102-106), the mapping service (e.g., hosted on system 110) may request additional vector tiles (e.g., from storage device 114) as may be necessary, for example, when the requested vector tiles have not already been cached in a local memory of the user device. It should be noted that the server(s) which serve the vector tiles can be the same or different server(s) from the server(s) which serve other data (e.g., image data) to electronic device 102-106.

Furthermore, the GUI on electronic device 102-106 interfaces with computing system 110 in order to coordinate the operation of user interface elements for the mapping service. For example, the GUI and the mapping service may operate together so as to allow the user to interact with either GUI or the mapping service in order to change the user's virtual location or views displayed on the map as provided by the mapping service. Further, any detected user interaction may cause a change in location or orientation to be reflected in the visual representation of the map or satellite imagery corresponding to a particular geographic location as displayed in the GUI or in another content area provided by the mapping service or both.

It should be noted that in addition providing mapping directly to electronic device 102-106, the mapping service hosted on server 110 can also be invoked through a map search request performed at electronic device 102-106. Thus, in example aspects, processing device 112a executes computer instructions stored in data store 112b, for example, to host a map search service. The map search service hosted on server 112 receives a search query from electronic device 102-106 over network 108. The map search service processes the search query and, in response, provides one or more search results to electronic device 102-106. The search query can be for a map search system or a general search query that includes a term that the map search service, or another service, identifies as map related.

The map search service identifies a location for one or more of the search results. The location may include, for example, coordinates in a coordinate system, such as a latitude, a longitude, and a zoom level. Electronic device 102-106 receives the search results, processes the instructions in the search results, and sends a request to the mapping service hosted on server 110 via network 108. In response, the mapping service provides one or more vector tiles to electronic device 102-106 via network 108. Electronic device 102-106 receives the vector tiles from the mapping service, and uses the instructions from the search results to render the vector tiles to display a map.

The vector tiles received by electronic devices 102-106 can correspond to multiple layers. Layers can correspond to different types of geographical features (e.g., a street map layer, a bike path layer, a terrain layer, a topological view layer). Layers can also correspond to layers of different places, for example based on different search queries. For example, a displayed map can include a café layer corresponding to a search for cafés, and a grocery store layer corresponding to a search for grocery stores.

Electronic device 102-106 can display multiple map layers in order. Electronic device 102-106 receives, from a server (e.g., 110) first vector data which defines one or more features for a first layer. Electronic device 102-106 receives, from the server (e.g., 110), second vector data which defines one or more features for a second layer. Electronic device 102-106 receives an order (e.g., a user-specified order) for displaying the one or more features of the first layer relative to the one more features of the second layer. Electronic device 102-106 renders the first vector data and the second vector data for display based on the received order, to display the one or more features defined by the first layer relative to the one or more features defined by the second layer based on the received order.

Figure 2A:
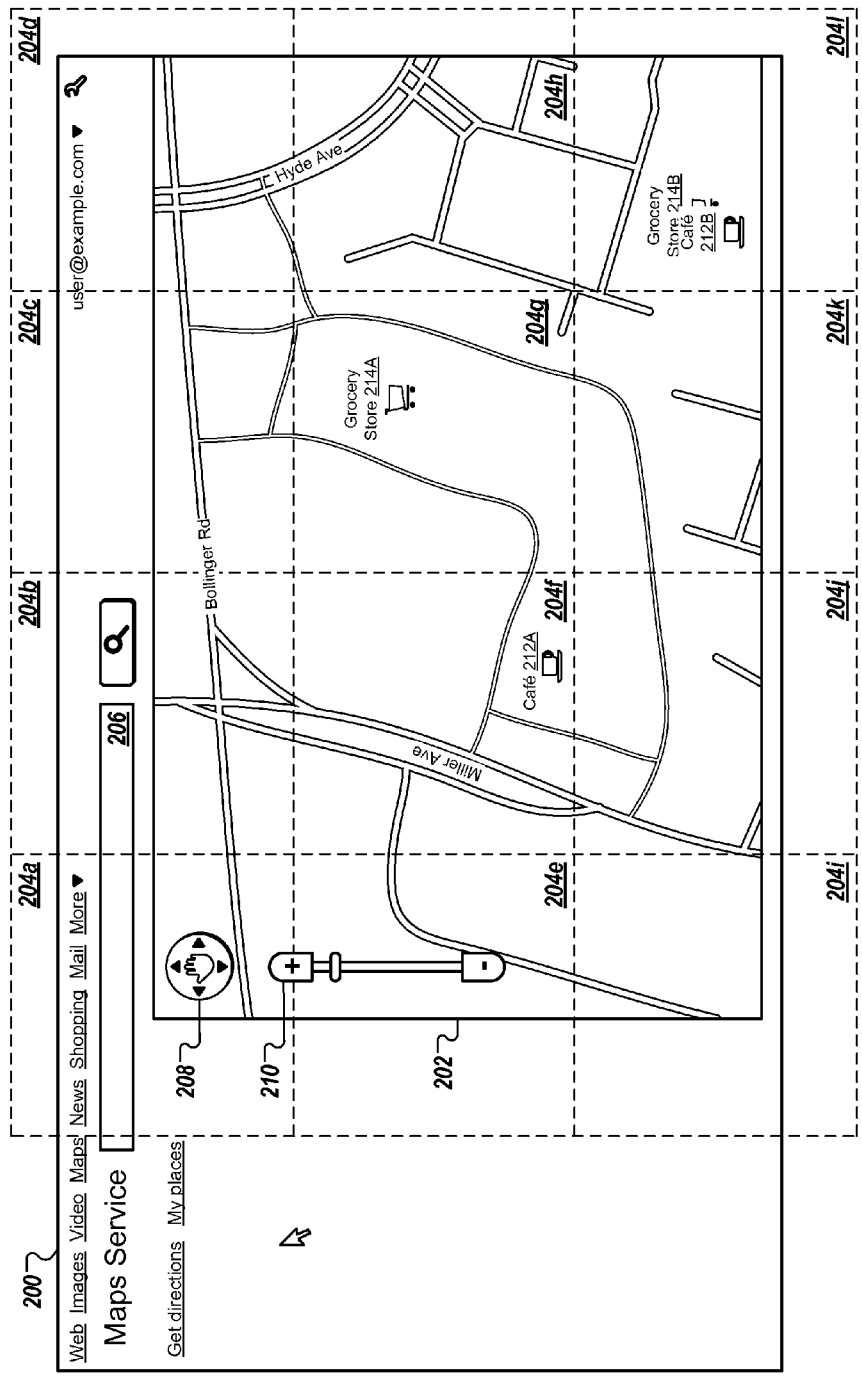
FIGS. 2A-2B illustrate an example of a graphical user interface for displaying map layers in order.
Figure 2B:
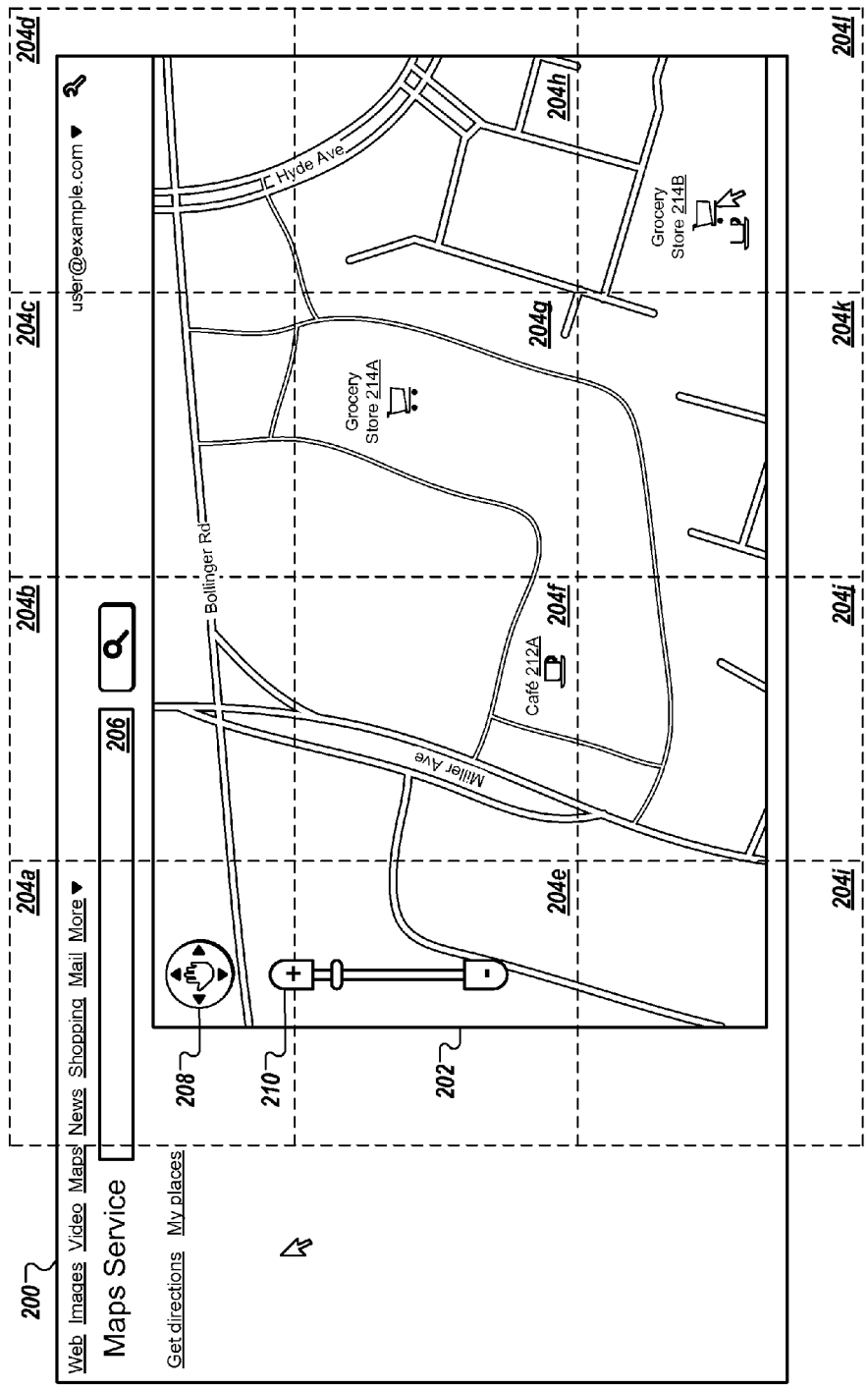

FIGS. 2A-2B illustrate an example of a graphical user interface for displaying map layers in order. FIG. 2A shows an example of a graphical user interface 200 for presenting rendered tiles including two layers (e.g., a café layer and a grocery store layer). In the example of FIG. 2A, the graphical user interface 200 is a web page provided by a map search service (e.g., hosted on server 112). It should be noted that the subject disclosure is not limited to web pages provided by a map search service, and that other applications which relate to mapping can be used.

The graphical user interface 200 includes a map area 202. The map area 202 presents at least a portion of one or more rendered tiles 204a-l (e.g., rendered from vector data) that make up a map. The map may include other tiles that are not currently presented within the map area 202, such as tiles to the left, right, up, down, or on different zoom level than the rendered tiles 204a-l. The dotted lines represent the full extent of each of the rendered tiles 204a-l, but only the portion of each of the rendered tiles 204a-l that is within the map area 202 is presented to a user in the graphical user interface 200.

The graphical user interface 200 includes instructions from the map search service (e.g., hosted on server 112) for downloading the vector tiles from a mapping service (e.g., hosted on server 110). The vector tiles can be downloaded in bulk or individually. As noted above, a vector tile corresponds to vector data from which an image corresponding to a map the can be rendered. A vector tile includes vector data for points, lines or polygons (e.g., rectangles, circles, other geometric features, or rasters such as overlaid images), where the points, lines and polygons represent features of a map. In addition, attributes for the vector tiles can be downloaded for the features represented by the vector tiles. The attributes can be part of each vector tile or separate (e.g., where attributes apply to multiple vector tiles). These attributes include, but are not limited to, color, size, style, associated text, highlighting and animation for the points, lines and polygons. Based on the vector tiles and attributes received from the mapping service, the electronic device (e.g., 102-106) can render the vector data to produce rendered tiles (e.g., 204a-l) corresponding to the map. In example aspects, vectors can be rendered using vector rendering engines including, but not limited to, Scalable Vector Graphics (SVG), Vector Markup Language (VML), Canvas 2D, or Web Graphics Library (WebGL).

The graphical user interface 200 instructions may include information related to the vector tile, such as information that identifies a zoom level of the vector tile and a position of the vector tile within the zoom level (e.g., in an x-y coordinate space). Regarding zoom level, it should be noted that the amount of data provided for a vector tile may vary based on the zoom level. For example, the vector tiles for "Bollinger Rd" in FIG. 2A received from the mapping service (e.g., hosted on server 110) may have a lower level of detail (e.g., less detail in terms of vector points, lines, polygons or attributes corresponding to the road shape) in a low zoom level, and may have a higher level of detail in a high zoom level. In a further example, when the zoom level is very low (e.g., zoomed out at a state or country level), certain features (e.g., a road such as "Bollinger Rd") may be omitted entirely from vector tiles. Thus, the thinning of features is provided for, so that the mapping service (e.g., hosted on server 110) does not send millions of features for zoomed out tiles.

The graphical user interface 200 includes controls that allow a user to interact with the map area 202. For example, the graphical user interface 200 may include a search control 206 that can receive a search query input from a user, such as the search query "Sunnydale, Calif." The graphical user interface 200 provides the search query to the map search service (e.g., hosted on server 112). The map search service (e.g., hosted on server 112) determines that the search query includes a city of "Sunnydale" and a state of "CA" or "California."

In example aspects, the map search service (e.g., hosted on server 112) and/or the mapping service (e.g., hosted on server 110) identify the vector tiles around the identified location and provide information regarding the identified vector tiles (e.g., in the form of tile identifiers) to the electronic device (e.g., 102-106). The electronic device (e.g., 102-106) then sends one or more requests to the mapping service (e.g., hosted on server 110) for the corresponding vector tiles.

The graphical user interface 200 instructions can include an identifier for a type of tile (e.g., a layer) to be downloaded, such as a street map tile, a topographical map tile, or a road overlay map tile. For example, the electronic device (e.g., 102-106) can send a request for vector tiles that includes a "bike" identifier. The "bike" identifier indicates that the electronic device (e.g., 102-106) has requested that the mapping service (e.g., hosted on server 110) provide a street map the and a bike path tile. These tiles are received as vector tiles at the electronic device and rendered at the electronic device for display as map tiles. In another example, the electronic device (e.g., 102-106) can send a request for vector tiles that includes a "t@127" identifier. The "t@127" indicates that the electronic device (e.g., 102-106) has requested that the mapping service (e.g., hosted on server 110) provide a terrain or topological tile together with a road overlay tile.

In addition to layers corresponding to different types of geographical features (e.g., street maps, bike paths, terrain, topological view), layers can also correspond to layers of different places. In the example of FIG. 2A, a café layer can include cafés 212A and 212B, and a grocery store layer can include grocery stores 214A and 214B.

The map search service (e.g., hosted on server 112) and/or the mapping service (e.g., hosted on server 110) can provide instructions to the electronic device (e.g., 102-106) to overlay at least one tile (e.g., corresponding to a first layer) on top of another tile (e.g., corresponding to a second layer). The electronic device (e.g., 102-106) then receives the overlay tile and the other tile, and uses the instructions to present the overlay tile on top of the other tile. The electronic device (e.g., 102-106) then presents the combination of the overlay tile and the other tile in the graphical user interface 200 as one of the rendered tiles 204a-l, in rendering the vector data, transparencies can be included in the graphics so as to have one layer show through another layer, or to reduce overlap of displayed layers. The transparency data can be provided (e.g., from the mapping service) within the vector tiles or separate from the vector tiles.

With further reference to multiple layers, an advantage of client-side rendering is that when a backend request fails to respond, a failure signal can be sent to the front-end client. For example, an application (e.g., a browser at electronic device 102-106) can fetch a single tile from layers A and B a single HTTP request. The backend (e.g., the mapping service hosted on server 110) for layer B fails to respond, and the frontend application sends the data for layer A and a failure for layer B in its response. The application displays layer A immediately, then retries layer B at a later time.

The graphical user interface 200 also includes a pan control 208 and a zoom level control 210. A user can make an input using the pan control 208 or another type of input, such as with arrow keys on a keyboard/touchscreen or by clicking and dragging the map area 202 with a pointing device, to pan to the map area 202 to the left, right, up, or down. A user can make an input using the zoom level control 210 or another type of input, such as by double clicking on the map area 202 with a pointing device, to zoom to another zoom level in the map area 202. The graphical user interface 200 includes instructions that receive the inputs and pans or zooms the map area 202 to a new position or zoom level within the map. In response, the graphical user interface 200 sends a request to the mapping service (e.g., hosted on server 110) for additional tiles that are located at the new position and/or zoom level.

FIG. 2B shows an example of the graphical user interface 200 in which the order of displaying layers is updated. As such, an order can be specified for displaying multiple layers.

In the example of FIGS. 2A-2B, different orders are used for displaying the café layer (with cafés 212A and 212B) and the grocery store layer (with grocery store 214A and 214B). In FIG. 2A, the café layer is overlaid on top of grocery layer. For example, with reference to café 212B and grocery store 214B as displayed within rendered tile 2041, café 212B is overlaid on top of grocery store 214B. However, in FIG. 2B, the grocery store layer is overlaid on top of the café layer. For example, with reference to café 212B and grocery store 214B as displayed within rendered tile 2041, grocery store 214B is overlaid on top of café 212B.

The first layer can correspond to a point of interest specified by a user (e.g., a search for "café" in search control 206), and the second layer can correspond to a point of interest specified by the user (e.g., a search for "grocery store" in search control 206).

An order for displaying features for a first layer e.g., the café layer) relative to features of a second layer (the grocery store layer) can be received for graphical interface 200. The one or more features defined by the first layer are displayed relative to the one or more features defined by the second layer based on the received order.

The order can be, but is not limited to, a user-specified value. For example, the order can be specified by a hover event associated with a feature in either the first layer or the second layer. In the example of FIG. 2B, a hover event is detected in association with grocery store 2B. In response to the hover event, the order for displaying the grocery layer relative to the café layer is changed from that of FIG. 2A, so that the grocery layer is overlaid on top of the café layer. In this regard, if other grocery stores (not shown) of the grocery layer were hidden in the background, the hover event can trigger these hidden grocery stores to be overlaid on top of other features/layers and to become more visible. It should be noted that specifying the order or layers is not limited to hover events, and can be effected by other user interactions, including, but not limited to, clicks events, touches (for touchscreen devices), menu driven interfaces, and text input. In example aspects, the order is not a user-specified value, and can correspond, for example, to a preset value (e.g., a default value defining an order for displaying layers).

In example aspects, the order for displaying layers can be changed at any time by the user (e.g., by hovering over a feature on a layer which is not on top). In this manner, reordering of layers is possible at electronic device 102-106, without necessarily having to access the mapping service (e.g., hosted on server 110). Stated otherwise, a new order for displaying features the first layer relative to features of the second layer is received, and the first vector data and the second vector data are re-rendered for display based on the received new order, to display the features defined by the first layer relative to the features defined by the second layer based on the received new order. The new order can be a user-specified value (e.g., a hover event or other user input).

In addition to changing the order of displaying layers, electronic device 102-106 can further provide for differentiated display of the features of a first layer relative to the features of a second layer. For example, the providing for differentiated display can include changing at least one of color, size, style, text, highlighting or animation of at least one feature, so as to differentiate the one or more features of the first layer relative to the one or more features of the second layer.

While the example of FIGS. 2A-2B illustrate changing the order of displaying layers for two layers, the subject technology is not limited to two layers. The subject technology allows for changing the order of display for virtually any number of layers.

Several considerations can be taken into account when repainting features within the map. In this regard, the display of tile boundaries can be avoided (or reduced) during a large repaint. For example, some actions, such as restyling every feature on the map, may require repainting many features. In some browsers, tiles may become apparent during such a repaint. To avoid this, the application (e.g., graphical user interface 200) can repaint all tiles synchronously in a single operation.

In addition, the unnecessary repainting of tiles can be avoided. For example, some actions, such as changing the style of one feature or changing order in which layers are displayed, may affect few or none of the tiles on screen. For example, a change may occur in an offscreen area. To facilitate this, each tile can expose the set of feature IDs (corresponding to the selected features), class/style IDs (corresponding to a selected class/style) and layer information for all features in that tile. These sets can be consulted in order to avoid repainting tiles that are not affected by a change.

Furthermore, a repaint can be limited to a small region when a small feature changes. For example, some actions, such as repainting a marker during a bounce animation frame, only requires repainting a small region. To facilitate this, within each tile each feature can store the bounding rectangle for the portion of that feature that lies within the tile. When repainting individual features, these bounding rectangles can be consulted. If they are small enough, only that portion of the tile is repainted. This allows even slow browsers (or other applications) to support smooth animations such as bouncing markers.

In example aspects, inconsistent thinning across tile boundaries can be problematic for the backend server(s). For example, if two neighboring tiles with different densities both require thinning, features which straddle the tile boundary may be thinned by one tile server (e.g., mapping service) but not by the neighboring tile's server (e.g., mapping service). This can be avoided or reduced by performing a double itch operation. For example, the browser first sends its viewport and zoom level to the backend (e.g., mapping service hosted by server 110), which returns a "thinning cookie" to the browser. The backend can consult an in-memory histogram to obtain a quick estimate of the feature density d_viewport within the viewport. For a target density d_target, a sampling factor can be computed as $s=d\_target/d\_viewport$. The value s can be rounded to the nearest $2^n$, to improve cache hit rates, and n to can be encrypted avoid leaking the histogram. The resulting "thinning cookie" can be returned to the browser. Once the browser receives the thinning cookie, it requests each the in view, simply appending the thinning cookie to each tile request. When a request hits a the server, the server extracts the thinning cookie (optionally decrypting), and computes the sampling rate s, and deterministically samples the features in view by the sampling rate s, such as by comparing each feature's ID to the sampling parameter s. Although each tile request may hit a different tile server, each tile server thins deterministically from the same information, such that thinning agrees across tile boundaries.

Accordingly, the subject disclosure provides for displaying map layers in order. The display of map layers is provided without the need for a client (e.g., electronic device 102-106) repeatedly access a mapping service (e.g., hosted on server 110). Rather, based on an initial set of vector data received the mapping service hosted on server 110), the client itself (e.g., electronic device 102-106) can provide for the display of map layers in order.

In general, the use of vector data for mapping tiles can provide advantages over use of image tiles. In this regard, vectors can be faster than image tiles. Vectors are typically much more compact than images, so they require low bandwidth. In addition, images can require one HTTP request per tile, whereas vectors can be bundled into a single HTTP request. It should be noted that bundling trades HTTP request minimization against caching. Also, vectors are typically faster to render in hardware than images, some applications (e.g., browsers) moving to hardware rendering can see an advantage in using vectors. In addition, vectors can have an improved cache hit rate, since vectors can separate styling from geometry. Further, the appearance of vectors can be modified without an additional HTTP fetch.

The appearance of vectors can also be advantageous compared to image tiles. Vectors can be styled in the browser, and can support dynamic effects such as hover. Also, vectors can rescale smoothly during a continuous zoom.

Vectors can also be seen as a better API when compared to image tiles. Using vectors allows mapping application developers to expose programmatic access to features and allows the features to be restyled, hidden and/or removed. In example aspects, vector tiles can include a per-tile status, which image tiles cannot. This allows for reloading just the tiles which fail to respond in time (e.g., for only the layers which fail to respond in time). With image tiles, the only solution is to reload all layers within the tile.

Figure 3:
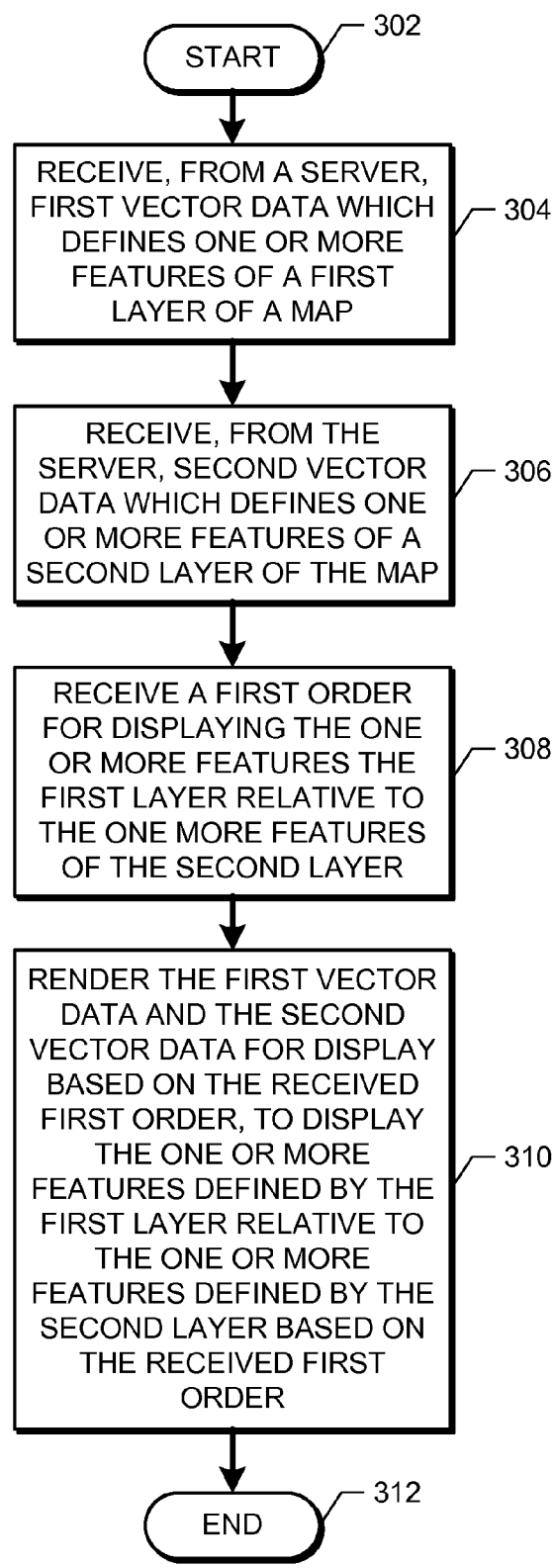
FIG. 3 illustrates an example process by which map layers are displayed in order.

FIG. 3 illustrates an example process by which map layers are displayed in order. Following start block 302, first vector data which defines one or more features of a first layer of a map is received from a server at step 304. At step 306, second vector data which defines one or more features of a second layer of the map is received from the server.

The first layer of the map can correspond to at least one point of interest specified by a user, and the second layer of the map can correspond to at least one other point of interest specified by the user. For example, the at least one point of interest and the at least one other point of interest can correspond to respective search queries by the user.

At step 308, a first order for displaying the one or more features of the first layer relative to the one more features of the second layer is received. The first order can be a user-specified value. Alternatively, the first order can correspond to a preset value (e.g., a default value defining an order). The first order can be specified by a hover event associated with a feature in either the first layer or the second layer.

At step 310, the first vector data and the second vector data are rendered for display based on the received first order, to display the one or more features defined by the first layer relative to the one or more features defined by the second layer based on the received first order. The receiving the first vector data, the receiving the second vector data and the rendering can be performed by an application (e.g., a web browser) on an electronic device.

The display of the one or more fixtures of the first layer can be differentiated relative to the display of the one or more features of the second layer based on the received first order. The differentiated display can correspond to changing at least one of color, size, style, text, highlighting or animation of at least one feature, so as to differentiate the one or more features of the first layer relative to the one or more features of the second layer.

A second order for displaying the one or more features of the first layer relative to the one more features of the second layer can be received. The first vector data and the second vector data for can be rendered for display based on the received second order, to display the one or more features defined by the first layer relative to the one or more features defined by the second layer based on the received second order. The second order can be a user-specified value. The process then ends at end block 312.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand atone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
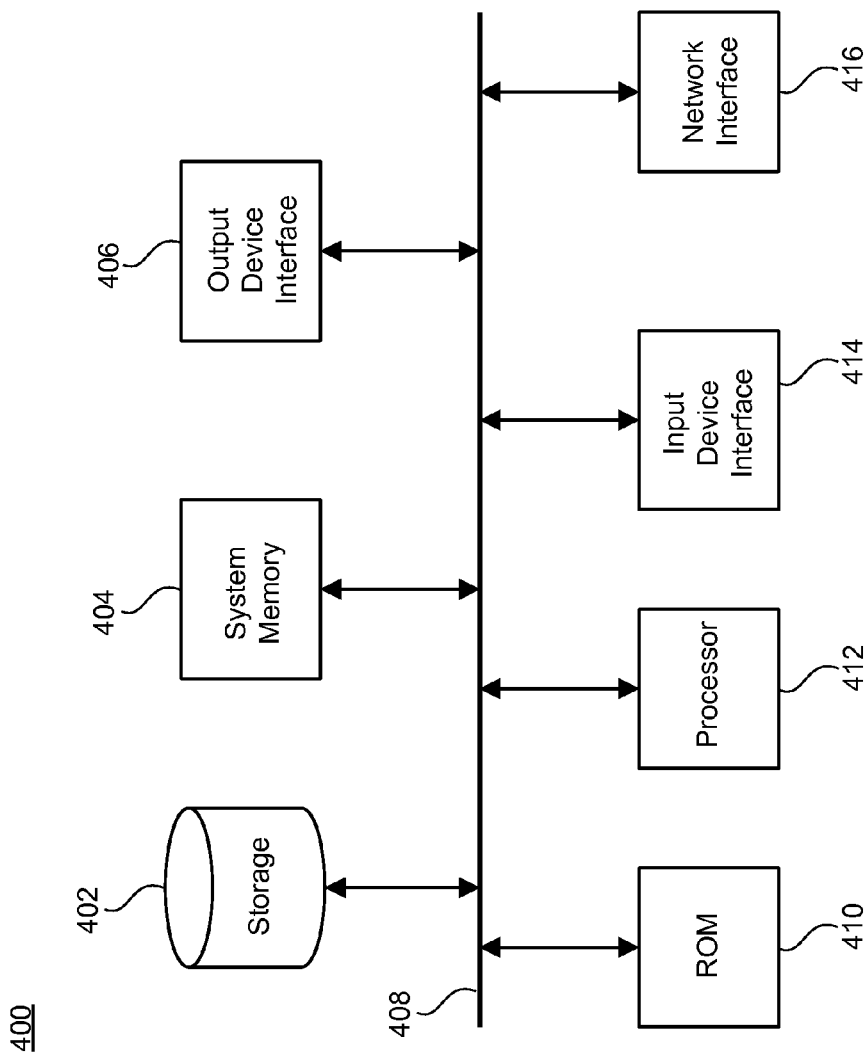
FIG. 4 conceptually illustrates an electronic system with which some implementations of the subject technology are implemented.

FIG. 4 conceptually illustrates an electronic system with which some implementations of the subject technology are implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for displaying map layers in order in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as (preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method of displaying map layers in order, the method comprising:

receiving from one or more servers, by one or more processors, map tiles in response to a first tile request including first vector data which defines one or more features of a first layer of a map and second vector data which defines one or more features of a second layer of the map, the one or more features of the first layer corresponding to a first type of point of interest and the one or more features of the second layer corresponding to a second type of point of interest;

sending to the one or more servers, by the one or more processors, a viewport and zoom level for rendering the map tiles of the first tile request;

receiving from the one or more servers, by the one or more processors, a thinning cookie including a sampling rate defined for a viewport and zoom level for rendering the map tiles of the first tile request;

receiving from the one or more servers, by the one or more processors, map tiles in response to a second tile request, wherein the second tile request comprises requested map tiles and the thinning cookie appended to each requested map tile in the second tile request such that the one or more servers are configured to deterministically sample the features within the map tiles of the second tile request by the sampling rate included in the thinning cookie;

wherein the receiving map tiles in response to a first tile request, the sending a viewport and zoom level, the receiving a thinning cookie, and the receiving map tiles in response to a second tile request collectively comprise a double fetch operation to reduce inconsistent thinning across boundaries of the map tiles including the first and second vector data;

receiving, by the one or more processors, a first order for displaying the one or more features of the first layer relative to the one more features of the second layer; and rendering, by the one or more processors, the first vector data and the second vector data for display based on the first order, such that the one or more features defined by the first layer are overlaid on top of the one or more features defined by the second layer;

receiving, by the one or more processors, user selection of one feature from among the one or more features in the second layer; and rendering, by the one or more processors, in response to receiving the selection of the one feature, the first vector data and the second vector data for display in a second order, the second order being different than the first order, such that the one or more features corresponding to the second type of point of interest are overlaid on top of the one or more features corresponding to the first type of point of interest, wherein the rendering of the first vector data and the second vector data for display in the second order is done without having to refetch any data from the server.

2. The method of claim 1, wherein the receiving the first vector data, the receiving the second vector data and the rendering are performed by an application on an electronic device.

3. The method of claim 2, wherein the application is a web browser.

4. The method of claim 1, wherein the first type of point of interest and the second type of point of interest correspond to respective search queries by the user.

5. The method of claim 1, wherein the first order is a user-specified value.

6. The method of claim 5, wherein the first order is specified by a hover event associated with a feature in either the first layer or the second layer.

7. The method of claim 1, further comprising:

providing for differentiated display of the one or more features of the first layer relative to the one or more features of the second layer based on the first order.

8. The method of claim 7, wherein the providing for differentiated display comprises changing at least one of color, size, style, text, highlighting or animation of at least one feature, so as to differentiate the one or more features of the first layer relative to the one or more features of the second layer.

9. A system for displaying map layers in order, the system comprising:

one or more processors; and a machine-readable medium comprising instructions stored therein, which when executed by the processors, cause the processors to perform operations comprising:

receiving, from one or more servers, map tiles in response to a first tile request including first vector data which defines one or more features of a first layer of a map and second vector data which defines one or more features of a second layer of the map, the one or more features of the first layer corresponding to a first type of point of interest and the one or more features of the second layer corresponding to a second type of point of interest;

sending to the one or more servers, a viewport and zoom level for rendering the map tiles of the first tile request;

receiving, from the one or more servers, a thinning cookie including a sampling rate defined for a viewport and zoom level for rendering the map tiles of the first tile request;

receiving, from the one or more servers, map tiles in response to a second tile request, wherein the second tile request comprises requested map tiles and the thinning cookie appended to each requested map tile in the second tile request such that the one or more servers are configured to deterministically sample the features within the map tiles of the second tile request by the sampling rate included in the thinning cookie;

wherein the receiving map tiles in response to a first tile request, the sending a viewport and zoom level, the receiving a thinning cookie, and the receiving map tiles in response to a second tile request collectively comprise a double fetch operation to reduce inconsistent thinning across boundaries of the map tiles including the first and second vector data;

receiving a first order, corresponding to a user-specified value, for displaying the one or more features of the first layer relative to the one more features of the second layer; and rendering the first vector data and the second vector data for display based on the first order, such that the one or more features defined by the first layer are overlaid on top of the one or more features defined by the second layer;

receiving user selection of one feature from among the one or more features in the second layer; and rendering, in response to receiving the selection of the one feature, the first vector data and the second vector data for display in a second order, the second order being different than the first order, such that the one or more features corresponding to the second type of point of interest are overlaid on top of the one or more features corresponding to the first type of point of interest, wherein the rendering of the first vector data and the second vector data for display in the second order is done without having to refetch any data from the server.

10. The system of claim 9, wherein the receiving the first vector data, the receiving the second vector data and the rendering are performed by an application on an electronic device.

11. The system of claim 9, wherein the first type of point of interest and the second type of point of interest correspond to respective search queries by the user.

12. The system of claim 9, wherein the first order is specified by a hover event associated with a feature in either the first layer or the second layer.

13. The system of claim 9, further comprising:
providing for differentiated display of the one or more features of the first layer relative to the one or more features of the second layer based on the first order.

14. The system of claim 13, wherein the providing for differentiated display comprises changing at least one of color, size, style, text, highlighting or animation of at least one feature, so as to differentiate the one or more features of the first layer relative to the one or more features of the second layer.

15. A non-transitory machine-readable medium comprising instructions stored therein, which when executed by a system, cause the system to perform operations comprising:
receiving, from one or more servers, map tiles in response to a first tile request including first vector data which defines one or more features of a first layer of a map and second vector data which defines one or more features of a second layer of the map, the one or more features of the first layer corresponding to a first type of point of interest and the one or more features of the second layer corresponding to a second type of point of interest;

sending to the one or more servers, a viewport and zoom level for rendering the map tiles of the first tile request;

receiving, from the one or more servers, a thinning cookie including a sampling rate defined for a viewport and zoom level for rendering the map tiles of the first tile request;

receiving, from the one or more servers, map tiles in response to a second tile request, wherein the second tile request comprises requested map tiles and the thinning cookie appended to each requested map tile in the second tile request such that the one or more servers are configured to deterministically sample the features within the map tiles of the second tile request by the sampling rate included in the thinning cookie;

wherein the receiving map tiles in response to a first tile request, the sending a viewport and zoom level, the receiving a thinning cookie, and the receiving map tiles in response to a second tile request collectively comprise a double fetch operation to reduce inconsistent thinning across boundaries of the map tiles including the first and second vector data;

receiving a first order for displaying the one or more features of the first layer relative to the one more features of the second layer; and rendering the first vector data and the second vector data for display based on the first order, such that the one or more features defined by the first layer are overlaid on top of the one or more features defined by the second layer;

receiving user selection of one feature from among the one or more features in the second layer; and rendering, in response to receiving the selection of the one feature, the first vector data and the second vector data for display in a second order, the second order being different than the first order, such that the one or more features corresponding to the second type of point of interest are overlaid on top of the one or more features corresponding to the first type of point of interest, wherein the rendering of the first vector data and the second vector data for display in the second order is done without having to refetch any data from the server.

* * * * *